(12) United States Patent
Sauermann

(10) Patent No.: US 7,873,666 B2
(45) Date of Patent: Jan. 18, 2011

(54) METHODS AND COMPUTER SYSTEMS FOR DATA CONVERSION

(75) Inventor: Volker Sauermann, Heldelberg (DE)

(73) Assignee: SAP AG, Walldorf (DE)

( * ) Notice: Subject to any disclaimer, the term of this patent is extended or adjusted under 35 U.S.C. 154(b) by 527 days.

(21) Appl. No.: 10/933,332

(22) Filed: Sep. 3, 2004

(65) Prior Publication Data

US 2005/0080803 A1 Apr. 14, 2005

(30) Foreign Application Priority Data

Sep. 5, 2003 (EP) .................................. 03020180

(51) Int. Cl.
 *G06F 7/00* (2006.01)
 *G06F 17/30* (2006.01)
(52) U.S. Cl. ...................................... 707/793; 707/804
(58) Field of Classification Search ................. 707/204, 707/100, 101, 201, 103 R, 793, 791, 804; 709/248, 218; 705/1

See application file for complete search history.

(56) References Cited

U.S. PATENT DOCUMENTS

| | | | | |
|---|---|---|---|---|
| 5,491,818 | A * | 2/1996 | Malatesta et al. ............ | 707/201 |
| 5,708,828 | A * | 1/1998 | Coleman ..................... | 715/523 |
| 6,081,811 | A * | 6/2000 | Nilsson ....................... | 707/201 |
| 6,125,388 | A * | 9/2000 | Reisman ..................... | 709/218 |
| 6,151,608 | A * | 11/2000 | Abrams ....................... | 707/204 |
| 6,195,662 | B1 * | 2/2001 | Ellis et al. ............... | 707/103 R |
| 6,601,072 | B1 * | 7/2003 | Gerken, III ............. | 707/103 R |
| 6,704,737 | B1 * | 3/2004 | Nixon et al. ................ | 707/101 |
| 6,735,623 | B1 * | 5/2004 | Prust .......................... | 709/219 |
| 6,996,589 | B1 * | 2/2006 | Jayaram et al. ............. | 707/204 |
| 7,051,119 | B2 * | 5/2006 | Shafron et al. ............. | 709/248 |
| 2002/0059259 | A1 * | 5/2002 | Cotner et al. ............... | 707/100 |
| 2004/0044539 | A1 * | 3/2004 | Taricco et al. ................. | 705/1 |
| 2004/0059651 | A1 * | 3/2004 | MaGuire et al. ............. | 705/30 |
| 2004/0181753 | A1 * | 9/2004 | Michaelides ................ | 715/523 |

OTHER PUBLICATIONS

Karlsson, Jonas S. et al., "IBM DB2 Everyplace: A Small Footprint Relational Database System," Apr. 2-6, 2001, 17th International Conference, pp. 230-232.*

Hasin, Essama, "Getting Started with DB2 V8 and ADO using Visual Basic 6," Feb. 13, 2003, IBM, pp. 1-17.*

M2 Presswire, "Developer Solutions: HiT Software release winAllora Xpress—Import and Export XML data to and from Relational Databases with no programming," Feb. 26, 2002, ProQuest, pp. 1-3.*

Bode, Thomas et al., "First Experiences with GEOSTORE, an Information System for Geologically Defined Geometrics," 1994, University of Bonn, pp. 1-10.*

(Continued)

*Primary Examiner*—Kuen S Lu
*Assistant Examiner*—Hexing Liu
(74) *Attorney, Agent, or Firm*—Finnegan, Henderson, Farabow, Garrett & Dunner LLP

(57) ABSTRACT

Methods and computer systems are provided for data conversion. In one embodiment, a conversion engine receives from an application a conversion request for data stored in a database and invokes the database to export the data into a conversion source file. The conversion engine may receive a set of rules from the application and convert the data of the conversion source file according to the set of rules. Thereafter, the converted data may be stored in a conversion target file.

20 Claims, 5 Drawing Sheets

OTHER PUBLICATIONS

Pitkow, James et al., "Supporting the Web: A Distributed Hyperlink Database System," May 6-10, 1996, Fifth International World Wide Web Conference, pp. 1-13.*

Babu, V. S.: "Updating Data in Oracle" VSBABU.ORG, ÄOnlineÜ Nov. 20, 2002, XP002269378 Retrieved from the Internet: <URL:http://vsbabu.org/mt/archives/2002/11/20/updating_data_in_oracle.html.

Durbin, J. et al.: "SQL*Loader Concepts" ORACLE8 Utilities, ÄOnlineÜ Dec. 1997, XP002269379 Retrieved from the Internet: <URL:http://otn.oracle.co.kr/docs/oracle78/server.804/a58244/ch03.htm.

* cited by examiner

METHODS AND COMPUTER SYSTEMS FOR DATA CONVERSION

FIELD

Embodiments of the present invention generally relate to electronic data processing and, more particularly, relate to methods, computer program products and systems for data conversion.

BACKGROUND INFORMATION

Mass data conversions are sometimes necessary in application systems, such as enterprise resource planning (ERP) systems, customer relationship management (CRM) systems, or supply chain management (SCM) systems. Typically, the affected data have to be converted using predefined rules.

For example, during a merger of two companies, several existing application systems may be merged. The new company needs to harmonize data from two different system landscapes that were created independently. Some examples of data conversion problems that typically arise in mergers are:

i) If document numbers for the new legal entity overlap in the two system landscapes, then the document numbers in one system landscape must be shifted into a number range that is disjoint from the document numbers in the other system landscape. To implement this, for example, in one of the system landscapes an offset is added to all the document numbers for that company code in all the relevant tables.

ii) Charts of accounts may be converted or the business year shifted in one system to match the business year in another system. For example, in one system the business year may start on January 1 and. in the other system on October 1.

iii) Material numbers may be changed, or currencies converted, such as during the introduction of the euro.

As these examples show, there are many reasons why mass data conversions may be needed. The data involved may include financial documents, change documents, material master data, text tables, and so on.

Some application systems, such as SAP R/3 based systems, support data conversion by, for example, generating a list of tables containing attributes to be converted and further generating a database view containing the attributes from the tables. The data for the view is then copied into a cluster table from where the application reads the data record by record through an appropriate application database interface and a SQL interface. Finally, the application performs the conversion, and then writes the converted data back to the database using again the application database interface and the SQL interface.

Other application systems, such as the Dayton Technologies ENC Billing Conversion system, generate a spool file including the data to be converted. A conversion program processes the spool file according to a conversion profile. After data validation, the conversion program creates a submission file that is submitted to an interface of a billing system that can handle the submission file.

In both implementations, multiple software layers and interfaces are involved in the data conversion process. Each interface is consuming time in the conversion process for routing the data to the next layer.

In some cases, a data conversion takes longer (e.g., more than a weekend) than a company can afford.

SUMMARY

Consistent with embodiments the present invention, methods, computer systems and computer program products are provided to improve the performance of data conversion for application systems. This may be achieved by embodiments of the invention, as disclosed herein.

In one embodiment, a separate conversion engine receives from an application a conversion request for data stored in a database. The conversion engine invokes the database to export the data into a conversion source file. Then, the conversion engine gets a set of rules from the application and converts the data of the conversion source file according to the set of rules. The converted data is then stored in a conversion target file.

Consistent with one embodiment, performing the data conversion outside the application may allow the computer system to bypass interfaces between the application and the database. These interfaces are responsible for slowing down the data retrieval from the database. Consistent with an aspect of the invention, the time for retrieving the data from the database may be limited by the read access times to the database for exporting the data and the time to store the data in a file of a file system.

The update of the database with converted data may be based on the same principle of bypassing the application-database interfaces and, therefore, may lead to further gains with respect to the total conversion time for the data stored in the database.

Aspects consistent with the present invention will be realized and attained by means of the elements and combinations particularly pointed out in this disclosure and the appended claims. The described combination of the features consistent with the present invention are not to be understood as a limitation, and all the features can be combined in other constellations without departing from the spirit of the invention. It is to be understood that both the foregoing general description and the following detailed description are exemplary and explanatory only and are not restrictive of the embodiments of the invention as described.

Additional objects and advantages of embodiments of the invention will be set forth in part in the description which follows, and in part will be obvious from the description, or may be learned by practice of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles consistent with the present invention. In the drawings.

DETAILED DESCRIPTION

Reference will now be made in detail to the present embodiments (exemplary embodiments) of the invention, example of which are illustrated in the accompanying drawings. Wherever possible, the same reference numbers will be used throughout the drawings to refer to the same or like parts.

Figure 1:
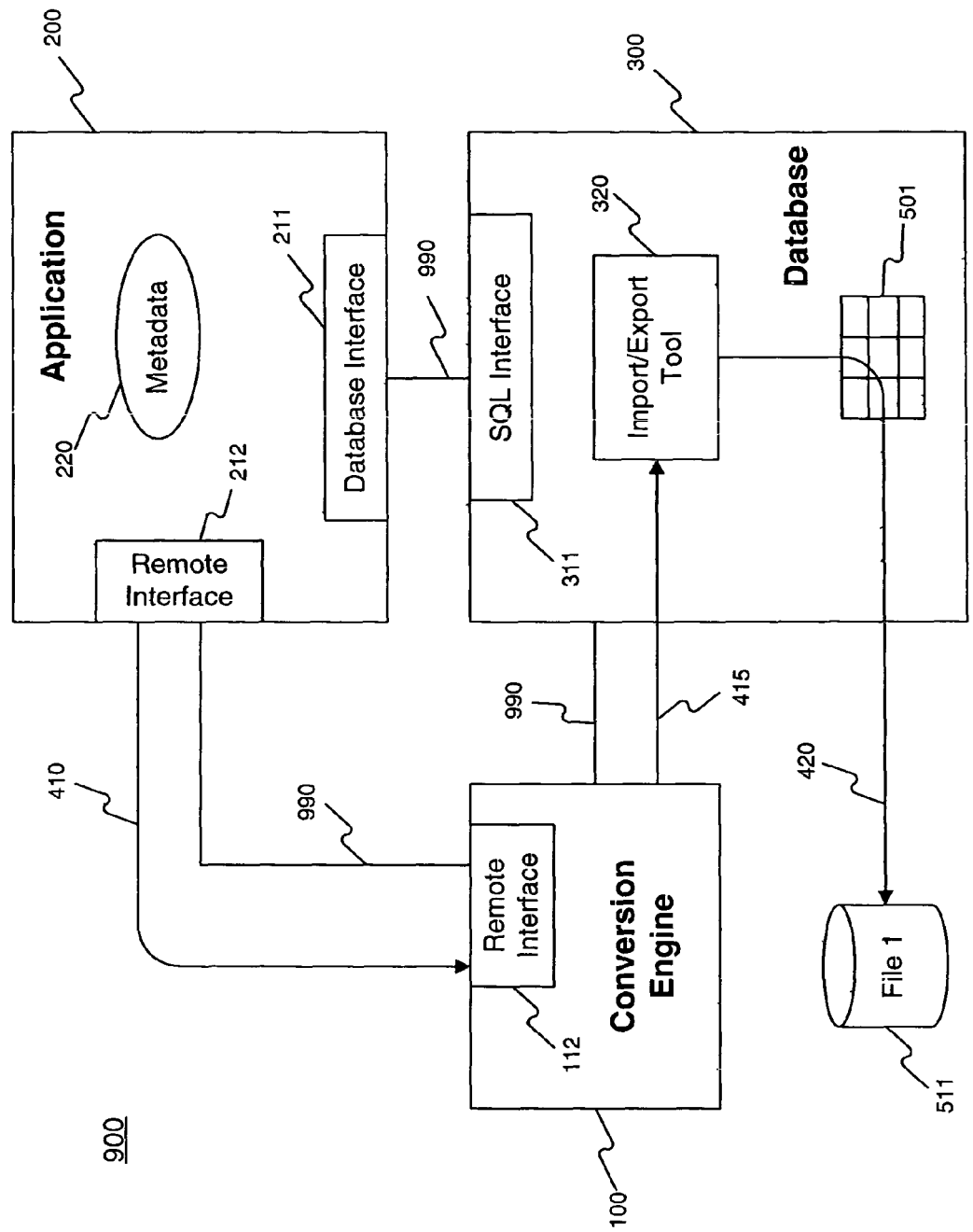
FIG. 1 is a block diagram of an exemplary computer system for data conversion, consistent with an embodiment of the invention.

FIG. 1 is a simplified block diagram of an exemplary computer system 900 for data conversion, consistent with an embodiment of the invention.

The computer system 900 includes an application 200 that uses data table 501 that is subject to conversion. The data table 501 is stored in a database 300, for example, in corresponding data table. The application 200 can communicate with the database 300 over a network 990. To access the data, the application 200 may use its database interface 211 and a corresponding SQL interface 311 of the database 300. For example, the application 200 can be a business application, such as a SAP R/3 application, or any other software application that makes use of data conversion. An application usually includes a plurality of application programs for performing various application tasks. The database 300 can be a relational database system, such as, for example, an ORACLE database or a Microsoft SQL server.

The computer system 900 further includes a separate conversion engine 100. The conversion engine 100 can communicate with the application 200 through the remote interfaces 112, 212 over the network 990 and will also be referred to as engine 100.

For example, in a SAP application that is built on the ABAP programming language, ABAP provides a set of function modules that are bundled together to form an application programming interface (API). An ABAP application program may use this API to send requests and commands to the engine 100. The engine 100 can be registered as a remote function call (RFC) server at an SAP gateway. The engine 100 listens for incoming RFC calls at the SAP gateway, fetches and processes these calls and returns the results to the SAP gateway. The SAP application fetches the results from the SAP gateway and makes them available to the ABAP program.

The remote interface 112 of the engine 100 includes a set of methods that may be implemented in C or C++ or another appropriate programming language. The methods of the conversion engine remote interface 112 correspond to the methods of the application remote interface 212. When an application program calls a method, the call including any parameter values is routed to the corresponding method in the remote interface 112 of the conversion engine 100.

For example, an application program may call an appropriate method of the application remote interface 212 to request data conversion of specific data used by the application 200. The data conversion request is sent to the engine 100. The data conversion request can include a table export request including table metadata 220 from an application data dictionary. When the data conversion request is received (410) by the engine 100, the table metadata 220 informs the engine 100 about columns, data types, field lengths, etc., that are included in the corresponding data table 501.

The purpose of this call is to export 420 the corresponding data table 501 from the database 300 into a conversion source file 511. After having received 410 the conversion request, the engine 100 invokes 415 a database import/export tool 320 to export 420 the requested data table 501 into the conversion source file 511. For example, the conversion source file 511 can be a flat file stored in a file system. To invoke 415 the import/export tool 320 the engine can, for example, run a script at operating system level which calls the import/export tool 320. The script can instruct the import/export tool 320 about the format, delimiters, and so on to be used for the export.

Table export is a feature offered by many commercial databases, such as, for example, ORACLE 9i, IBM DB2, or Microsoft SQL Server. The database extracts the table data into the conversion source file 511 using format specifications defined by a user. In the above example, the user is the engine 100 using the script. The database table export is faster than the submission of the corresponding table data to the application 200 through the various interfaces and software layers. The export speed is only limited by the read and write speed of the involved disks that are used by the database 300 to store the data table 501. Apart from a format conversion, no algorithms or business logic are applied to the data, and no further software layers like the SQL interface of the database 300 or the application database interface are used.

After the conversion request of the application program has been executed, a copy of the relevant table data is located in the conversion source file 511 outside the database 300 and may be processed by the engine 100. At this stage, the engine 100 either informs the application program that the data extraction was successful or reports an error. The application program still controls the data conversion process and can respond to errors by taking appropriate actions.

In case the engine 100 receives no further instructions from the application program, the engine 100 can then read and interpret the conversion source file 511 generated by the database 300 by using the table metadata 220.

Figure 2:
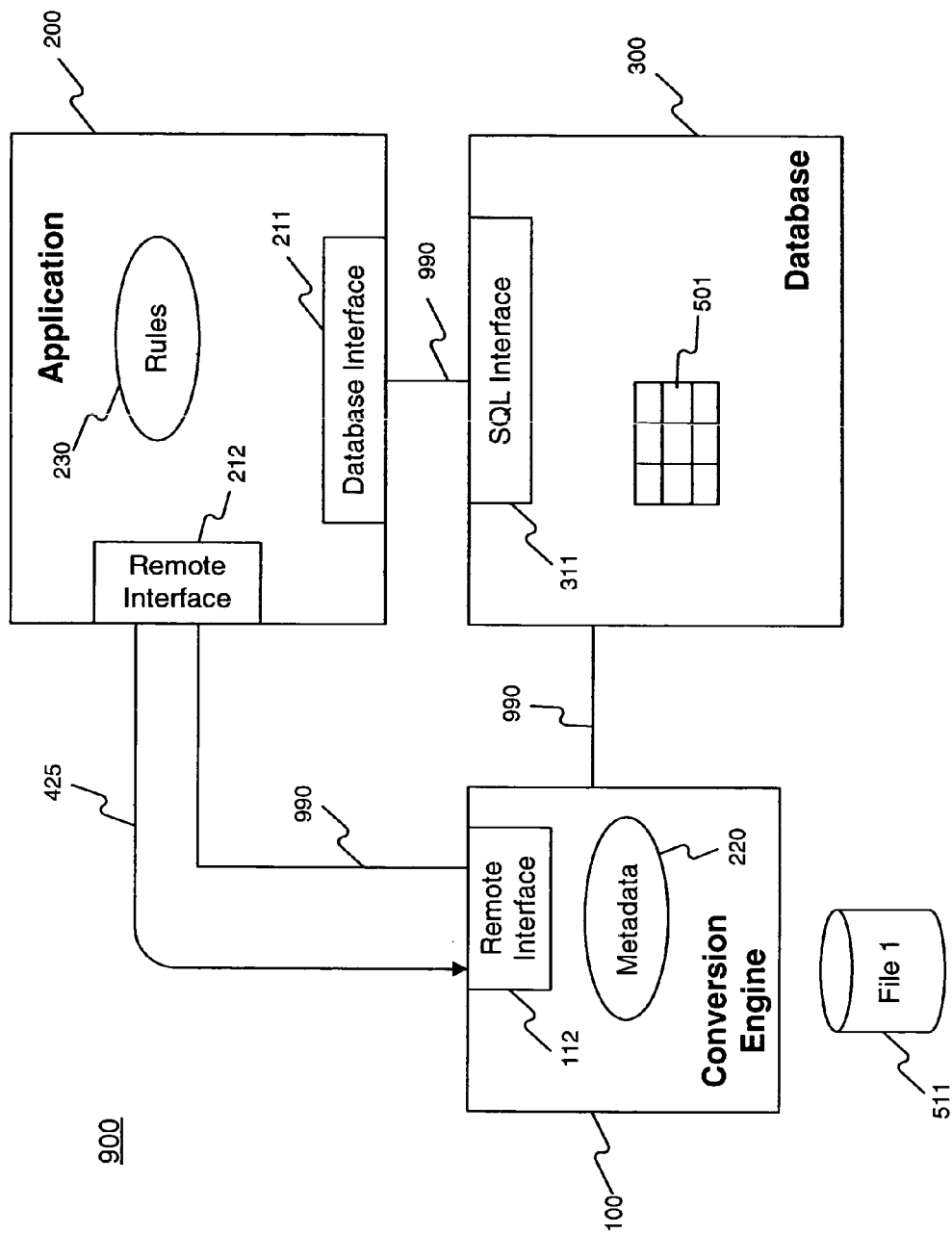
FIG. 2 illustrates, by way of example, the use of metadata and rules for data conversion by a computer system.

In FIG. 2, the engine 100 includes the metadata 220 received through the remote interface 112. Further, the application 200 has a set of rules 230. The set of rules 230 may include all rules that are relevant to the data conversion of the data in the conversion source file 511. The application program does not apply the set of rules 230 to the data in data table 501, but instead provides 425 the rules to the engine 100 by calling a corresponding method in the remote interface 212.

In one embodiment, a rule to be applied to the data in the conversion source file 511 may include three parts:

a) A query specifying which records to convert. Using basic logical rules, any Boolean statement can be converted into conjunctive or disjunctive normal form. The conditions of a normal form may be provided in the form of a table where each line contains one condition. If no query is provided, that is, if the table is empty, then all records of a given table are converted.

b) One or more mathematical expressions that define how records matching the query are converted. The formula(s) include the name of at least one table column as variable. Example: the query is "CURRENCY DEM" and two formulas are "REVENUE=REVENUE*1.95583; CURRENCY=EUR". First, the query filters all records with currency equal to DEM (German marks). The two formulas are applied to these records only, to convert the revenue value and the currency to Euro. The mathematical expressions may be any valid string including brackets and so on. The engine 100 parses the formulas for application to the data.

c) One or more value tables (mapping tables) including mapping rules by providing pairs "old value-new value." For very large mapping tables, the information can be stored as separate files in a file system, either on the computer running the engine 100 or on a different computer. Instead of passing huge value tables to the engine 100, it can be more efficient to provide a URL or a file path to the engine 100 so that it reads the data directly from the indicated location into main memory. In the engine 100, the corresponding value pairs may be indexed appropriately in main memory, for example, using the old values as index keys. The engine 100 may store the indexed data either as a binary tree or in sorted order in an array (for example, sorted by the old values) for fast access using an interval bisection algorithm known in the art as binary search. To perform a fast mapping operation, the engine can retrieve the old values quickly. This is achieved by indexing the data by the old values and storing the new values together with the corresponding old values. So as soon as an old value has been located, the new value is available to replace it.

Mathematical expressions and value tables may be applied simultaneously to the same table, but also to different or even overlapping subsets of data. For example, in an SAP R/3 based application, the rules are encoded as parameters and ABAP internal tables using a proprietary format which is explained in more detail in FIG. 3.

Figure 3:
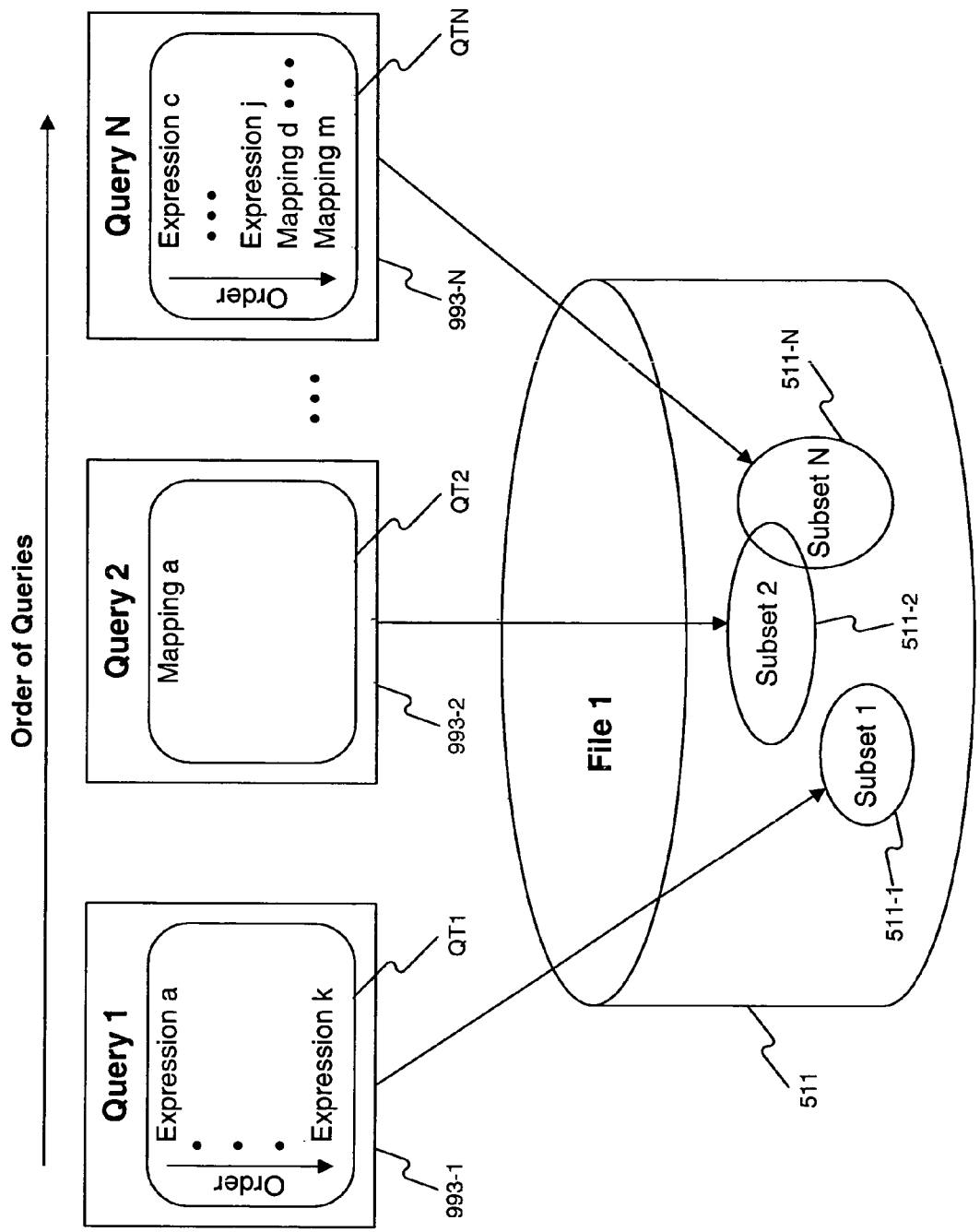
FIG. 3 illustrates an exemplary relationship between queries and data subsets that are subject to data conversion.

FIG. 3 shows, by way of example, how different queries can define different subsets 511-1, 511-2, 511-N of the data table 501 that are stored in the conversion source file 511. The subsets may overlap, like the second subset 511-2 and Nth subset 511-N. One or more mathematical expressions and/or value tables can be related to each query. The engine 100 applies expressions and/or mappings to the corresponding subset of records listed in the order in corresponding tables.

For example, expressions a to k are applied to the first subset of records 511-1 defined by a first query 993-1 in that order. In the corresponding internal table QT1, the expressions are listed in that order. To the subset of records 511-2 defined by the second query 993-2, only mapping a in table QT2 is applied. Finally, to the Nth subset of records 511-N defined by the query 993-N, first the expressions c to j apply and then the mappings d to m. Expressions and mappings may also be defined in table QTN to apply in mixed order. The queries 1, . . . , N and their related mapping rules and expressions apply in the order of their enumeration.

The relationship between queries, expressions, mapping rules, and their order of application to the data as shown in FIG. 3 is reflected in the following table design that may be used in an embodiment of the invention using an SAP R/3 based application 200. The table design enables an ABAP program to pass all the information to the engine 100 in the form of ABAP internal tables via the ABAP RFC API.

As well as separate tables defining queries, mathematical expressions, and mappings (see below: Tab. 4, Tab. 6, Tab. 7), a table can be used that includes the relationship between the three elements of a rule. The table layout may be as shown in Tab. 1:

TABLE 1

Table layout for relating Query, Mathematical Expression, and Value Table

| Query Number | Expression Number | Value Table Number |
| --- | --- | --- |

The column "Query Number" includes the number of a query in the query table (cf. Tab. 2). The query number serves as a foreign key that points to a corresponding set of conditions in the query table (cf. Tab. A) representing a specific query. The foreign key information is just a number, such as a 4-byte integer. At the same time, via the expression number this table assigns a specific mathematical expression to a query. The expression is defined in a separate expression table (cf. Tab. 6). The expression number is a foreign key to a set of mathematical expressions stored in the expression table. The same foreign key principle can be used to assign a group of mapping entries in a separate value table to the query. That is, the column "Value Table Number" includes the number of a value mapping in the mapping table (cf. Tab. 7).

TABLE 2

Relationship between queries, expressions, and mappings

| Query Number | Expression Number | Value Table Number |
| --- | --- | --- |
| 1 | 12 | |
| 2 | 17 | |
| 2 | | 5 |
| 3 | | 8 |
| 3 | 24 | |
| 4 | | 31 |

In Tab. 2, the data of a table is subdivided into four parts (e.g. query number), which need not be disjoint (that is, overlaps are allowed)

The order of queries in tab. 2 can be defined by the order of the entries from top to bottom. Query 1 identifies a particular subset of all table records. Expression 12 applies to this subset of records, but no value table applies to them. Query 2 identifies a subset of records to which firstly expression 17 and secondly a mapping defined in value table number 5 are applied. To the records matching query 3, the mapping defined in value table 8 and then the expression 24 are applied. To the records matching query 4, the mapping defined in value table number 31 is applied but no mathematical expression. The sequence of expressions and value tables listed in the example of tab. 2 defines their order of application to the subsets of records matching the respective query numbers. The expression numbers and value table numbers used in this example are arbitrary. Numbers identify a particular expression or value table number uniquely, but they need not be contiguous. Therefore, it is not necessary to start with 1.

Tab. 3 is an example of a query table structure. A database query is a Boolean combination of conditions. Each condition is an expression, such as name_first="Bill". The following example is a query in disjunctive normal form (DNF):

(CI AND c2) OR (c3 AND c4 AND c5) OR c6

Within the brackets of a DNF all conditions are combined with AND. The brackets are combined with OR. The inverse case is the conjunctive normal form (CNF) The following example is a query in CNF:

(c1 OR c2) AND (c3 OR c4 OR c5) AND c6

A normal form (disjunctive or conjunctive) has only one level of brackets, that is, no nested brackets occur. Therefore, it is easy to translate any query in either form into the following table format:

TABLE 3

Query table. The query numbers in Table 1 point to entries in this table.

| Query Number | Table Name | Level Counter | Attribute Name | Operator | Value 1 | Value 2 |
| --- | --- | --- | --- | --- | --- | --- |
| <Table 1 foreign key> | | | | | | |

In addition to the query table, a parameter NORMAL_FORM with values "C" (conjunctive) and "D" (disjunctive) is useful in the interface of the corresponding method. This parameter specifies how to interpret the table entries, since the table contains the conditions but not the Boolean operators (AND, OR).

Each table row has one condition. A condition consists of attribute name, operator, and a value (Value 1) or value range (Value 1, Value 2). The column "Level counter" is used to mark the conditions of one specific bracket. All conditions with the same level counter value are interpreted to belong to the same bracket. As soon as the value of the level counter changes from one table row to the next, the next bracket starts. The level counter values are arbitrary and need not start at 1. They must be different but need not be contiguous.

If the flag NORMAL_FORM has value "D" (disjunctive), all conditions with the same level counter value are combined with AND, since they represent one bracket. The results of the brackets (when the level counter changes its value) are afterwards combined with OR.

If the flag NORMAL_FORM has value "C" (conjunctive), all conditions with the same level counter value are combined with OR, and the results of the brackets are combined with AND.

This way of representing queries in disjunctive or conjunctive normal form does not require explicit brackets or AND/OR operators in the table.

Alternatively, a query could simply be sent to the engine 100 as a string (like the WHERE clause of an SQL statement) to be parsed by the engine 100.

The above described query table format is already pre-structured and may be applied to the data without extra time and effort for parsing.

As an example of a query, assume that a data conversion applies to records that match the following query:

(FLAG1='X' AND FLAG2< >'Q' AND NAME LAST>'H*') OR (BIRTHDT between 1960* and 1980* AND COLOR='red').

The statement is in DNF, so the import parameter of the ABAP function module of the RFC API is set to NORMAL_FORM='D.' The attributes refer to an application table TI that is subject to extraction (e.g., data table 501, cf. FIG. 1). The query table (cf. Tab. 3) is filled out as shown in Tab. 4:

TABLE 4

Filling the query table

| Query Number | Table Name | Level Counter | Attribute Name | Operator | Value 1 | Value 2 |
|---|---|---|---|---|---|---|
| 1 | Ti | 1 | FLAG1 | EQ | X | |
| 1 | TI | 1 | FLAG2 | NE | Q | |
| 1 | Ti | 1 | NAME_LAST | GT | H* | |
| 1 | TI | 2 | BIRTHDT | BT | 1960* | 1980* |
| 1 | Ti | 2 | COLOR | EQ | red | |
| 2 | ... | ... | ... | ... | ... | ... |
| 3 | ... | ... | ... | ... | ... | ... |

The entries for the further queries 2, 3, . . . in the table are indicated by " . . . "

Possible operator values in ABAP are for example:
EQ (equal) .=
NE (not equal) < >
GT (greater than) >
GE (greater equal) >=
LT (less than) <
LE (less equal) <=
ET (between) [..]
NB (not between) ]..[

If the attribute names refer to different tables (e.g., T2, T3, . . . , Tx), the table name corresponding to each attribute is entered in column "Table Name" and all tables involved are extracted from the database 300 into a flat file (e.g., conversion source file 511). In this case, during the application of queries, the C/C++ engine filters the matching records using several files. The information about how the different tables are related with foreign keys or join conditions is also available in the ABAP Data Dictionary and may be provided to the engine 100 in a relation table (cf. Tab. 5), which can have the following format:

TABLE 5

Example of a relation table for a SAP R/3 based application

| Table Name 1 | Attribute Name 1 | Table Name 2 | Attribute Name 2 |
|---|---|---|---|
| TI | MANDT | T2 | MANDT |
| TI | KUNNR. | T2' | KUNNR |

In this example depicted in Tab. 5, a record of table TI with a given value for a field MANDT (client) and a field KUNNR (customer number) corresponds to a record in table T2 identified by the same values for fields MANDT and KUNNR. In this way, records of table Ti are uniquely related to their corresponding records in table T2, and queries relating to more than one table can be evaluated.

In the example of Tab. 4, query 1 has five entries. This indicates that the five conditions all belong to the same query. If N different queries are stored in the table, then N different query numbers occur in the table indicating for each condition which query it belongs to. In the example above, this is shown schematically for further queries 2, 3 with dotted entries.

The level counter in Tab. 4 indicates that the first three rows belong to the first bracket, since they have all the same value 1. The fourth and fifth row belong to the second bracket, since they have a level counter value different from 1. The level counter value only needs to be different from the level counter value(s) from the previous row(s) to indicate the beginning of a new bracket. In the above example, any other value different from 1 would work.

Tab. 6 shows an example of a table structure for storing mathematical expressions. In Tab. 6, the expression number is the foreign key stored in the corresponding column of Tab. 2. First, a query is evaluated and then one or more expressions stored in Tab. 6 are applied to the matching records.

TABLE 6

Exemplary table structure for a table storing mathematical expressions

| Expression Number | Table Name | Expression |
|---|---|---|
| 17 | TI | UMSA1 = UMSA1 * 1.95583 |
| 17 | TI | WAER = EUR |
| 5 | ... | ... |
| 5 | ... | ... |

For example, Tab. 2 contains a query number 2 that relates to an expression number 17. Tab. 6 indicates that behind this expression number 17 there are two subsequent mathematical operations: first, multiply the value contained in field UMSA1 (revenue) by 1.95583, and second, set the value in field WAER (currency) to 'Eur.' These operations can be used for a euro conversion. The corresponding query in this example is WAER='DEM', that is, the mathematical expression is only applied to field with currency DEN. A further query with a different query number would filter for another currency, such as, for example, WAER='ATS.' A different mathematical expression would relate to this further query.

For this euro conversion example, each of the currencies to be converted corresponds to a separate query with an appropriate mathematical expression. All the expressions with their different numbers are stored in Tab. 6 and passed to the engine 100. The expressions are simple text strings which are parsed and checked syntactically by the engine 100. The engine 100 may also check whether the field names and table names are all, available in the extracted files, and if they are not, report an error to the corresponding ABAP program for further error handling.

Tab. 7 is an example of a mapping table for value mappings containing either value pairs (old value-new value) or a link to a file containing value pairs.

TABLE 7

Mapping table for value mappings

| Value table number | Table name | Attribute name | Old value | New value | Path' |
|---|---|---|---|---|---|
| 5 | T1 | MATNR | 4711 | 1324 | |
| 5 | T1 | MATNR | 4712 | 1325 | |
| 5 | T1 | MATNR | 4713 | 1326 | |
| . | . | . | . | . | |
| . | . | . | . | . | |
| . | . | . | . | . | |
| 5 | T1 | MATNR | 9999 | 6321 | |
| 8 | | | | | \\pl23\C:\Mappings\mappingl.txt |
| 31 | | | ... | ... | ... |
| . | | | . | . | . |
| . | | | . | . | . |
| . | | | . | . | . |
| 31 | | | ... | ... | ... |

In Tab. 7, the table number is the foreign key in the value table number column of Tab. 2. For query number 2 the corresponding value table number in Tab. 2 is 5. Therefore, the value mappings included in tab. 7 with value table number 5 are applied to the records matching the related query 2. When the engine 100 receives tab. 7, it indexes the value pairs (old value-new value) as described above. For example, the engine 100 generates a separate index for each value table number.

Alternatively, the value pairs are stored not in Tab. 7 but in a separate file. For value table 8, a path indicates from where the engine 100 can load the value pairs, which are then indexed in the same manner as the value pairs stored explicitly in Tab. 7. This allows specialized tools that store their output in separate files to generate automatic or semiautomatic value mappings. If there are many value pairs, it may be more efficient from a performance standpoint for the engine 100 to load the file instead of providing a huge number of value pairs via the RFC API to the engine 100.

The steps performed by the engine are as follows:

a) Receive Tab. 7 including value mappings.

b) Read external value mappings from indicated files (path information).

c) Index the value mappings (number of indexes corresponds to the number of different value table numbers)

d) Apply the mappings:

i. Read the entries of the conversion source file 511 in the given order.

ii. If a given record of the conversion source file 511 matches the query, find the old value in the index (in the above example, it is field MATNR of table T1) and replace it by the corresponding new value, which is stored in the index together with the old value.

iii. Write the modified record to a target file.

In SAP R/3 based systems, business processes are usually implemented in ABAP. The ABAP programs have the application knowledge. However, an ABAP program cannot perform fast mass data manipulations on the database, for example, because of the various interface levels in between and the application of business rules. The separate conversion engine 100 implemented in, for example, C or C++, can access and modify the exported data stored in one or more conversion source files more efficiently. The engine 100 has no business process knowledge, but the ABAP programs share their business knowledge with the engine 100 in the form of the set of rules 230. The engine 100 then applies the rules to the data of the conversion source file(s)

Figure 4:
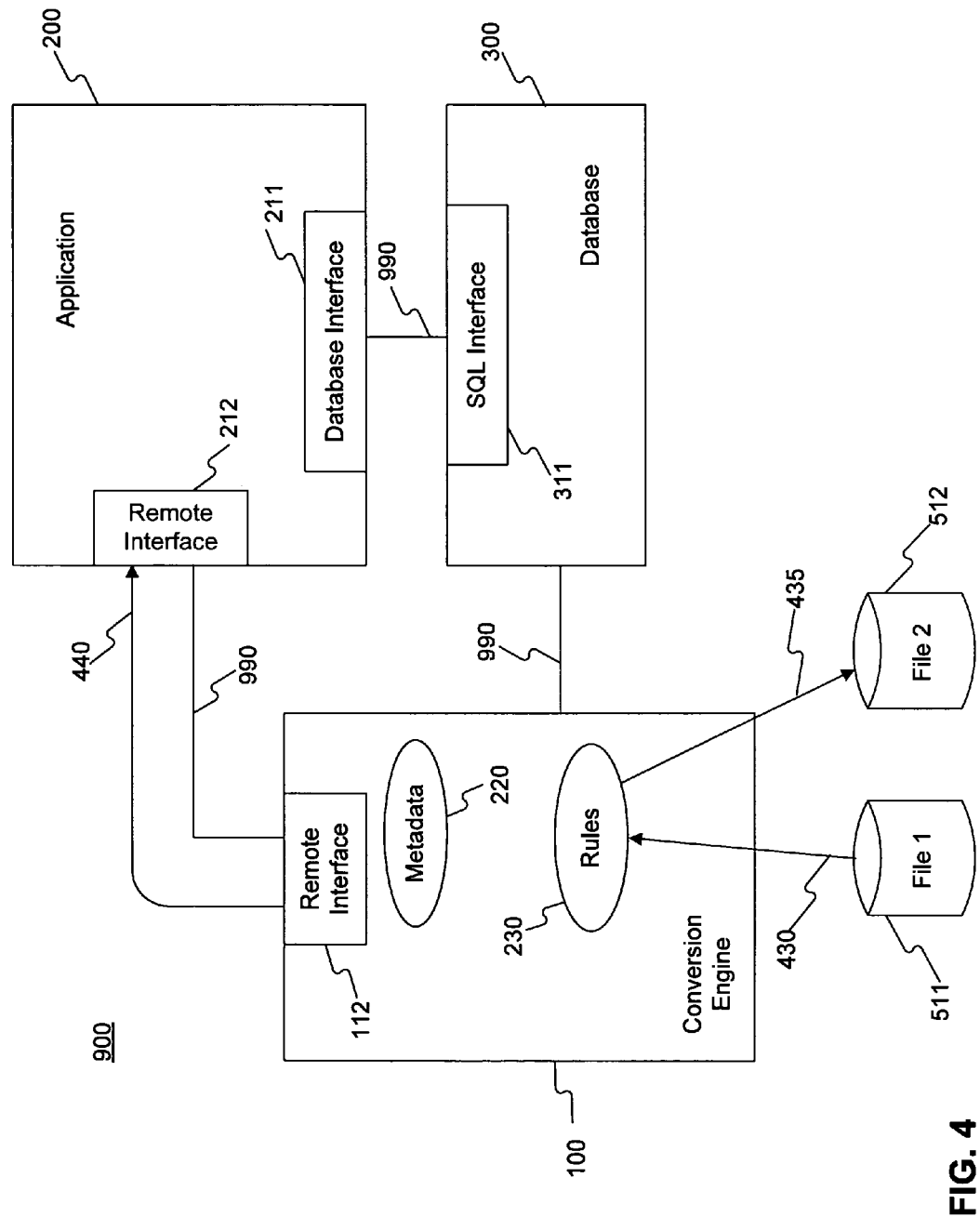
FIG. 4 shows an exemplary data conversion by a computer system using files.

FIG. 4 shows an example of how the engine 100 can apply the set of rules 230 to the data stored in the conversion source file 511.

The engine 100 reads 430 the records included in the conversion source file 511 in the given order, checks each record to see if it matches one of the queries (e.g., the queries are checked in the order they are listed in tab. 2), and, if the query matches, applies the expressions and/or mappings related to each query. That is, the engine 100 checks if query 1 matches, and if it does, applies, the related expressions and/or mappings. Next, it checks if the same record matches query 2, and if it does, applies the expressions and/or mappings related to query 2 to the same record. Once all queries have been processed, the converted record is stored 435 in a conversion target file 512 and the same process is repeated with the next record of the conversion source file 511. Alternatively, the converted record can be stored in the conversion source file 511 by overwriting the original record. The file including the converted data will be referred to as converted file.

After having applied all expressions and/or mappings to all records included in the conversion source file 511, the engine 100 notifies 440 the application program and provides an error log. Meanwhile, the application program had nothing to do. No system resources (CPU time or main memory) were consumed to perform the above described conversion operation. The data conversion is completely outsourced to the engine 100, which performs the conversion faster than an application program could ever do.

Figure 5:
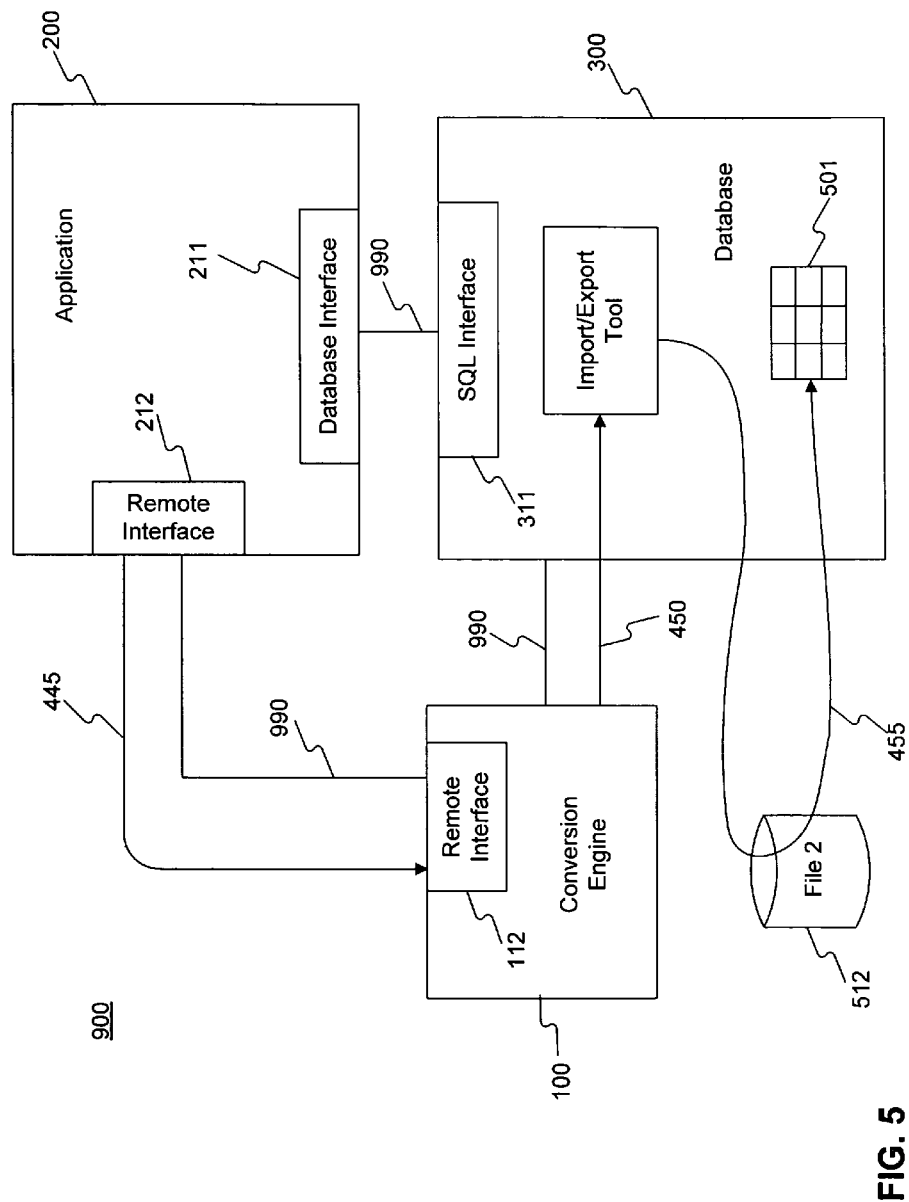
FIG. 5 illustrates an exemplary import of converted data into a database.

In the example of FIG. 5, no conversion errors occurred and the application program sends an update request to the engine 100. For example, the update request obtained 445 by the engine 100, includes instructions to import 455 the converted data of the conversion target file 512 into the database 300. For example, as an update request, the application program can send a corresponding table import request by using a particular RFC call. The engine 100 can then use a second script to instruct 450 the import/export tool 320 of the database 300. In case the engine 100 is implemented in C/C++, the second script may be called from C/C++ using the corresponding command "system" that is part of the C/C++ programming language. The second script includes commands at operating system level that instruct the database 300 to import the conversion target file 512 and update the corresponding data table 501 in the database 300. For example, the second script may tell the import/export tool 320 where to find the conversion target file 512 in the file system. In case of conversion errors the application program can perform appropriate error handling.

Embodiments of the invention can be implemented in digital electronic circuitry, or in computer hardware, firmware, software, or in combinations of them. Embodiments of the invention can be implemented as an archiving computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. An archiving computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps consistent with the present invention can be performed by one or more programmable processors executing a computer program to perform functions consistent with the present invention by operating on input data and generating output. Method steps can also be performed by, and apparatus consistent with the present invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation consistent with the present invention, or any combination of such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method for data conversion, the method comprising:

receiving from an application a conversion request for data stored in a database;

invoking the database to export the data into a conversion source file by bypassing an application programming interface between the application and the database, wherein data associated with processing the conversion request passes between the database and the application without passing the application programming interface;

obtaining, from the application, a set of rules for generating converted data, at least one rule of the set of rules comprising a first part having at least one query specifying at least one subset of the data to convert, a second part having at least one mathematical expression that defines how the at least one subset of the data matching the at least one query is converted, and a third part having at least one value table including mapping rules for mapping between old values and new values, the set of rules being defined in a relation table that reflects the relationship between the at least one query stored in a query table, the at least one mathematical expression stored in an expression table, the at least one value table, and the order in which the set of rules are applied to the data, wherein the relation table includes a first foreign key referencing the query table, a second foreign key referencing the expression table, and a third foreign key referencing the at least one value table;

converting the data of the conversion source file according to the set of rules;

storing the converted data in a conversion target file, wherein the converting step comprises:

checking to see whether the at least one subset of the data matches the at least one query; and applying the at least one mathematical expression and the at least one value table, related to the at least one query, to the at least one subset of the data;

storing an indication of an error in an error log file when an error is detected during conversion of the data to the conversion target file; and providing the error log file to the application for error handling.

2. The method of claim 1, further comprising:

notifying the application upon completion of the converting step.

3. The method of claim 1, further comprising:

obtaining from the application an update request to update the data in the database with the converted data of the conversion target file; and instructing the database to execute the update request.

4. The method of claim 1, wherein the converting step comprises:
   reading the data from the conversion source file; and
   applying the set of rules to the data.

5. The method according to claim 4, wherein the conversion source file and the conversion target file are separate files stored in a file system.

6. The method according to claim 4, wherein the conversion source file and the conversion target file are the same file stored in a file system.

7. The method according to claim 3, wherein the invoking and instructing steps are executed by generating a first and second script, respectively.

8. The method of claim 1, wherein the conversion request in the receiving step comprises metadata for the data.

9. The method according to claim 7, wherein the export and the update of the data is executed by an import/export tool of the database.

10. A computer program product tangibly embodied in a machine-readable storage device for data conversion comprising a plurality of instructions that when loaded into a memory of a computer system cause at least one processor of the computer system to perform a method comprising:
   receiving from an application a conversion request for data stored in a database;
   invoking the database to export the data into a conversion source file by bypassing an application programming interface between the application and the database, wherein data associated with processing the conversion request passes between the database and the application without passing the application programming interface;
   obtaining, from the application, a set of rules for generating converted data, at least one rule of the set of rules comprising a first part having at least one query specifying at least one subset of the data to convert, a second part having at least one mathematical expression that defines how the at least one subset of the data matching the at least one query is converted, and a third part having at least one value table including mapping rules for mapping between old values and new values, the set of rules being defined in a relation table that reflects the relationship between the at least one query stored in a query table, the at least one mathematical expression stored in an expression table, the at least one value table, and the order in which the set of rules are applied to the data, wherein the relation table includes a first foreign key referencing the query table, a second foreign key referencing the expression table, and a third foreign key referencing the at least one value table;
   converting the data of the conversion source file according to the set of rules;
   storing the converted data in a conversion target file,
   wherein the converting step comprises:
      checking to see whether the at least one subset of the data matches the at least one query; and
      applying the at least one mathematical expression and the at least one value table, related to the at least one query, to the at least one subset of the data;
      storing an indication of an error in an error log file when an error is detected during conversion of the data to the conversion target file; and
      providing the error log file to the application for error handling.

11. A computer system implemented using computer hardware for data conversion comprising:
   an application;
   a database; and
   a separate conversion engine,
   where the application communicates with the database over a network by using an application programming interface,
   the conversion engine being operable to invoke the database to export data into a conversion source file by bypassing the application programming interface upon receiving a conversion request for the data from the application, wherein data associated with processing the conversion request passes between the database and the application without passing the application programming interface,
   the conversion engine receiving from the application a set of rules for generating converted data, wherein at least one rule of the set of rules comprises a first part having at least one query specifying at least one subset of the data to convert, a second part having at least one mathematical expression that defines how the at least one subset of the data matching the at least one query is converted, and a third part having at least one value table including mapping rules for mapping between old values and new values, the set of rules being defined in a relation table that reflects the relationship between the at least one query stored in a query table, the at least one mathematical expression stored in an expression table, the at least one value table, and the order in which the set of rules are applied to the data, wherein the relation table includes a first foreign key referencing the query table, a second foreign key referencing the expression table, and a third foreign key referencing the at least one value table; and
   the conversion engine being operable to convert the data of the conversion source file according to the set of rules and to store the converted data in a conversion target file,
   wherein the converting step comprises:
      checking to see whether the at least one subset of the data matches the at least one query;
      applying the at least one mathematical expression and the at least one value table, related to the at least one query, to the at least one subset of the data;
      storing an indication of an error in an error log file when an error is detected during conversion of the data to the conversion target file; and
      providing the error log file to the application for error handling.

12. The computer system of claim 11, wherein the application and the conversion engine have corresponding remote interfaces for remote communication.

13. The computer system of claim 11, wherein the application further comprises metadata for the data that is provided to the conversion engine.

14. The computer system of claim 12, wherein the conversion engine is operable to notify the application through the remote interfaces upon having stored the converted data.

15. The computer system according to claim 11, wherein the conversion engine is operable to obtain from the application an update request to update the data in the database with the converted data of the conversion target file, and further is operable to instruct the database to execute the update request.

16. The computer system of claim 15, wherein the database comprises an import/export tool to execute the export and the update of the data.

17. The method according to claim 1, wherein the mathematical expressions and value tables are applied simultaneously to convert the data stored in the database.

18. The computer program product according to claim 10, wherein the mathematical expressions and value tables are applied simultaneously to convert the data stored in the database.

19. The computer system according to claim 11, wherein the mathematical expressions and value tables are applied simultaneously to convert the data stored in the database.

20. The method according to claim 1, further comprising disallowing the application to access the data stored in the database via the application programming interface.

* * * * *